United States Patent [19]

Hunt

[11] 4,379,193

[45] Apr. 5, 1983

[54] HIGH PRESSURE DECORATIVE LAMINATES CONTAINING AN AIR-LAID WEB AND METHOD OF PRODUCING SAME

[75] Inventor: James E. B. Hunt, Staines, England

[73] Assignee: Formica Corporation, Wayne, N.J.

[21] Appl. No.: 233,418

[22] Filed: Feb. 11, 1981

[30] Foreign Application Priority Data

Feb. 29, 1980 [GB] United Kingdom ................. 8007002

[51] Int. Cl.³ .................... B32B 3/00; B32B 23/04; B32B 23/10
[52] U.S. Cl. .................... 428/196; 428/203; 428/204; 428/284; 428/286; 428/326; 428/332; 428/337; 428/503; 428/526
[58] Field of Search ............... 428/215, 196, 203, 204, 428/503, 332, 524–526, 248, 284, 286, 326, 337; 264/113

[56] References Cited

U.S. PATENT DOCUMENTS

| | | | |
|---|---|---|---|
| 2,698,271 | 12/1954 | Clark ..................................... | 264/113 |
| 2,739,081 | 3/1956 | Wohnsiedler et al. ......... | 428/503 X |
| 3,547,767 | 12/1970 | Keeling et al. ...................... | 428/203 |
| 4,006,048 | 2/1977 | Cannady et al. ................ | 428/203 X |
| 4,139,671 | 2/1979 | Kelly et al. ...................... | 428/503 X |
| 4,248,922 | 2/1981 | Shortway et al. .............. | 428/203 X |

*Primary Examiner*—Thomas J. Herbert, Jr.
*Attorney, Agent, or Firm*—Frank M. Van Riet

[57] ABSTRACT

The invention relates to high pressure decorative laminates containing an air-laid web as a substrate and to a method of preparing such a decorative laminate from an assembly comprising said substrate and a thermosetting resin impregnated decor sheet.

7 Claims, No Drawings

HIGH PRESSURE DECORATIVE LAMINATES CONTAINING AN AIR-LAID WEB AND METHOD OF PRODUCING SAME

BACKGROUND OF THE INVENTION

The production of substrates comprising cellulosic fibers and a thermosetting resin composition useful in supporting decorative layers in the formation of high pressure decorative thermoset plastics laminates is well known. Conventionally, said substrates comprise a plurality, i.e. about 2–10, of paper core sheets impregnated with a liquid thermo-setting resin composition, said core sheets being prepared by treating a web of paper, prepared by a wet-laying process, with a solution or dispersion of a thermosetting resin composition in a volatile solvent, drying said treated web to reduce the volatile matter content to a desired level and cutting said treated, dried paper web into sheets of the required dimensions.

In order to provide satisfactory handling and usage properties in said laminates, they are conventionally produced in thicknesses of from about 0.5 mm to about 2.0 mm, this thickness range being achieved primarily by superimposing a plurality of said paper core sheets. Whilst it would clearly be advantageous to use a single core sheet to provide the substrate for the laminate, there are problems of manufacture and processing associated with the production and resin-impregnation of wet laid paper sheets having a basis weight significantly greater than about 256 gsm (grammes per square meter) and a thickness of about 0.27 mm.

Further, it is desirable for environmental and energy conservation reasons, to obviate the drying stage necessary with conventionally produced resin composition treated paper substrates. Attempts have been made in the past to avoid this drying step by providing a wet-laid paper containing a thermo-setting resin composition in solid particulate form as a sheet of the laminate substrate and formed during the paper making process from an aqueous slurry comprising the paper fibers and the particulate resin.

However, this process has not found wide commercial acceptance because of problems arising from the propensity of the liquid phase to convey the resin particles through the forming wire.

Wet-laid papers, while generally producing high pressure decorative laminates of excellent properties, are known to have a propensity to stress-crack under conditions of low relative humidity. Therefore, conventional high pressure decorative laminates, after a period of time well within their expected life-times, may undergo a marked deterioration in their aesthetic appearance and utility. For this reason, conventional high pressure decorative laminates have not found successful commercial utility in many areas where low relative humidity is a prevalent condition especially where the laminates are first subjected to modification such as by notching, cutting or other treatment whereby sharp corners are cut into their cross section.

Wet-laid papers also exhibit a variation in at least some of their physical properties depending upon whether the properties are measured in the direction of travel of the machine wire upon which the paper was formed, or transversely of it. This variation in properties is due to the non-random orientation of the fibers in the paper due to the alignment of fiber caused by the flow of the liquid phase onto and through the wire and by surface tension effects. Laminates produced from substrates comprising said wet-laid papers also exhibit this direction dependent variation in at least some of their physical properties and although this is not generally disadvantageous, there are some applications where a laminate exhibiting less variation in physical properties according to the direction of measurement is preferred.

SUMMARY OF THE INVENTION

It has been found that high pressure decorative laminate produced from a thermosetting resin containing fibrous cellulosic substrate wherein the disadvantages of such a laminate made by conventional processes are overcome or diminished may be produced by using, as the substrate, an air-laid web comprising both cellulosic fibers and a thermosetting resin.

The novel high pressure decorative laminates of the present invention exhibit a toughness superior to laminates produced conventionally which contain, as their core, a plurality of thermosetting resin impregnated Kraft paper sheets. This toughness is evidenced by the laminates' increased resistance to stress-cracking.

Additionally, the instant high pressure decorative laminates also exhibit substantially equivalent uniform strength and dimensional properties regardless of the machine direction from which the measurement is taken.

BACKGROUND OF THE INVENTION

The manufacture of air-laid fibrous webs is well-known, and fibrous cellulosic webs useful for producing such diverse products as disposable wipes, diapers, insulation draperies, bed sheets, box-board and the like are commercially produced.

Commonly, air-laid fibrous webs are prepared by disintegrating fibrous, cellulosic material into its component fibers, transporting the fibers to a foraminous moving web-forming surface and depositing the fibers thereon to form a layer with the aid of suction applied to the under side of the surface. Usually the fibrous, cellulosic material is disintegrated into its component fibers by a machine such as a hammermill or disc refiner and the fibers are transported to the forming surface in an air-stream. Binder material is commonly applied to or admixed with the fibers as a particulate solid or as a liquid spray and the web deposited therefrom is then consolidated between nip rollers. When the binder is added as a solid to the air-fiber stream, it may be introduced into the hammermill or thereafter, but before deposition on the forming surface. Additionally, when the binder is used as a spray, the sprayed fibers may thereafter be dried and introduced as such into the forming apparatus.

A known apparatus for forming substrates by air-laying cellulosic fibers comprises: (i) an air-swept hammermill wherein cellulosic material is defibrated into its component fibers in an air-stream, (ii) ducting whereby the fiber containing air-stream is conveyed to a distributor, (iii) a distributor such as disclosed in U.S. Pat. No. 3,581,706, comprising a housing having a perforated planar bottom wall and side walls, one or more impellers mounted to rotate about an axis substantially perpendicular to the bottom wall a short distance above and in non-contacting relationship with the upper surface of said bottom wall, inlet means for the fiber containing air-stream to enter the distributor, outlet means whereby fibrous material may be recycled to the hammermill and, optionally, a plate member located above said impellers and extending inwardly from the side walls of the housing so as to form a partition between a lower part and an upper part of said housing, said distributor being positioned so that the bottom wall is co-operatively located above the upper surface of (iv) a moving, foraminous belt upon the upper surface of which the cellulosic fibers are deposited to form a layer with the aid of (v) means for applying suction to the other surface of said belt and (vi) means for compacting the so-deposited cellulosic fiber layer, see U.S. Pat. No. 2,698,271.

DESCRIPTION OF THE INVENTION INCLUDING PREFERRED EMBODIMENTS

When apparatus of the type described is used in the production of an air-laid cellulosic fibrous layer, there are a large number of variables that must be controlled in order that optimum formation of the layer occurs.

The more obvious variables include the input rate of the cellulosic material to the hammermill, the speed of rotation of the impellers and speed of travel of the belt and the degree of compaction applied. Other variables need to be controlled so as to optimize the method of preparing the air-laid cellulosic fiber layer by use of an apparatus of the type described above and, clearly, if a binder such as a particulate resin is to be incorporated within the layer, still further variables need to be controlled. For example, when preparing a substrate adapted for use in the production of the high pressure decorative laminates of the present invention, the thermosetting resin must be randomly distributed throughout the deposited layer and there must be sufficient of the resin present to provide the desired properties to the heat and pressure consolidated laminate. In the production of the high pressure decorative laminates of this invention, the resin content of the substrate lies in the range from about 20% to about 35%, by weight preferably from about 25% to about 30%, based on the total weight of the substrate.

In order that the high pressure decorative laminates of the present invention possess satisfactory properties, it is a requirement that the deposited layer used to form the substrate be uniform both with regard to composition and basis weight (weight per square meter).

It has been found that, for the formation of an air-laid substrate having the desired uniformity of composition and basis weight and comprising fibers and thermosetting resin, such as by means of an apparatus of the type described above, it is preferable to operate under conditions such that the air has a relative humidity within the range of about 40% to 80%, preferably about 50% to 70%.

If the air employed has a humidity level outside of the disclosed range, then deposition problems may arise in that at too high a humidity clogging of the ducting and screen may occur whilst at too low a humidity problems may arise due to static electrical charges on the fibers.

By the method of this invention, there is provided a monostichous substrate comprising a thermosetting resin and cellulosic fibers which substrate is uniform in composition and basis weight and is of a thickness such that a single ply is employed to provide the laminate core.

The thermosetting resin containing monostichous substrate of randomly oriented, suybstantially non-hydrogen bonded cellulosic fibers is formed using an apparatus of the type described above, by:

(a) feeding fibrous, cellulosic material to the air-swept hammermill and defibrating the material therein to provide cellulosic fibers of an average length of about 0.5 to 2.5, preferably about 0.75 to 2.0 mm in the presence of humidified air, the relative humidity of which preferably ranges from about 40% to about 80% to thereby form an air-fiber stream;

(b) incorporating into said air-fiber stream from about 20% to about 35%, by weight, of a thermosetting resin, said weight being based on the total weight of resin and fiber, to thereby form an air-fiber-resin stream;

(c) passing said air-fiber-resin stream to a distributor;

(d) agitating said stream within the distributor by impeller means;

(e) causing said stream to pass through the perforated bottom wall of the distributor;

(f) depositing the fibers and resin into a moving foraminous belt to form a layer having a thickness of from about 5 mm to about 100 mm, preferably about 10 mm to 80 mm by the operation of the suction means, and (g) pre-consolidating the deposited layer to a thickness of from about 0.5 mm to about 10.0 mm, preferably about 1.0 to about 8.0 mm.

The fibrous, cellulosic material employed may comprise any material such as chemical, semi-chemical or mechanical paper pulp, cardboard and waste paper and the like, provided that after defibration in the hammermill it comprises fibers of an average length of 0.5 mm to 2.5 mm. Although fibers produced from wood are preferred, fibers produced from straw, grass, bagasse, cotton or synthetics, may be used or in admixture. If the cellulosic material feed is in bulk form, then it is preferred to use a bale-breaker or similar equipment to partially disintegrate the material before it is fed to the hammermill.

The air fed to the hammermill may be humidified to the above-specified extent either internally or externally of the substrate forming apparatus. Thus the apparatus may be sited in a room, the air in which is humidified to the required degree and drawn through the apparatus at the required rate. Alternatively, the air may be drawn into the apparatus and there humidified such as by steam or water spray means to the required level. It is preferred to humidify the air internally of the apparatus as such allows for quicker adjustment of the humidity than is possible with external humidification and further allows the room air to be controlled independently so as to provide more amenable working conditions.

The said thermosetting resin may comprise any thermo-setting resin which provides the required properties in the substrate prepared therefrom. The resin may comprise, for example, a phenol-formaldehyde resin, a melamine-formaldehyde resin, a polyester resin or an epoxy resin and said resins may comprise known extenders, if desired. It is preferred to employ a particulate, thermosetting resin and even more preferred to employ a phenol-formaldehyde resin. Such a particulate resin may be prepared by forming a solid, thermosetting resin in bulk or lump form and then grinding or crushing to provide the desired particle size or, more preferably, it may be prepared in particulate form by known emulsion condensation techniques. The mean particle size of the thermosetting resin should range from about 20 microns to about 200 microns, preferably from about 50 to 150 microns.

The thermosetting resin may be incorporated into the air-fiber stream by any suitable means and at any suitable position. Thus the resin may be introduced into the hammermill, into the ducting between the hammermill and the distributor, or into the distributor. Suitable introductory means are known and include spraying means, gate-valves, fibratory-and screw-feeders etc. When particulate resin is used, it is preferred to employ screw feeders which employ a positive feed principle and can be controlled more precisely to give the feed rate of resin desired.

The air-laid layer may be pre-consolidated between platens or nip rollers as may be most convenient and the pre-consolidating means may be heated or cooled, if desired. If they are heated, then the pre-consolidation must be such that whilst there may be some conversion of a minor amount of the thermosetting resin to the thermoset form, a substantial proportion of the resin is still in the thermosetting form after the pre-consolidation operation. The air-laid layer, before pre-consolidation, must be of such a thickness that after heat and pressure consolidation during laminate formation the substrate or core of said laminate will range in thickness from about 0.25 mm to about 2.25 mm air-laid webs deposited on the belt, which may be constructed of metal or other material such as plastic, cloth etc. are deposited at the thickness specified above.

According to the instant invention, there is provided a heat and pressure consolidated, high pressure, thermoset decorative laminate comprising, in superimposed relationship:

(I) a thermoset resin containing, monostichous substrate of air-laid, randomly oriented, substantially non-hydrogen bonded cellulosic fibers having an average length of 0.5 to 2.5 mm, said substrate being from about 0.25 mm to about 2.25 mm thick and containing from about 20% to about 35%, by weight, of resin, based on the total weight of fiber and resin in I;

(II) a thermoset resin impregnated decorative sheet and optionally;

(III) a thermoset resin impregnated alpha-cellulosic overlay sheet.

In accordance with the instant invention, the method for preparing the thermoset, high pressure, decorative laminates comprises:

(1) Forming a laminate assembly comprising, in superimposed relationship:

(A) a monostichous, air-laid substrate of randomly oriented fibers of 0.5–2.5 mm average length, containing from about 20–35%, same basis as above, of a thermosetting resin and of sufficient thickness to provide, when consolidated, from about 0.25 mm to about 2.25 mm in thickness to the resultant laminate, (B) a thermosetting resin impregnated decorative sheet and, optionally, (C) a thermosetting resin impregnated alpha-cellulose overlay sheet; and (2) consolidating said assembly to a unitary thermoset laminate structure by the application of heat and pressure thereto.

The thermosetting resin impregnated decor sheet employed in the present invention may comprise any of those decor sheets known to provide the decorative surface on a decorative laminate and includes decorative woven or non-woven fabrics, colored or printed paper sheets, wood veneer, cork, and the like. The resin may be of any of those known for use in the production of thermoset laminates but it is preferred to use those 'noble' thermosetting resins known for such use and it is also preferred to employ a high quality printed or colored decorative paper sheet impregnated with a thermosetting melamine-formaldehyde resin composition. By 'noble' thermosetting resins is meant those resins which show no appreciable darkening or color change on conversion from the thermosetting to the thermoset state.

When a decorative woven or non-woven fabric sheet or a printed paper sheet is employed, it is preferred to use, in addition thereto, a surfacing overlay sheet known for use in the production of conventional thermoset laminates. More especially, it is preferred to use a light weight, high quality, unfilled alpha-cellulose paper sheet impregnated with the same kind of thermosetting resin composition as used to impregnate the decorative sheet and, still more preferably, an overlay sheet impregnated with a thermosetting melamine-formaldehyde resin may be employed.

The optional overlay sheet may comprise any of those overlay sheets known to provide a protective, abrasion-resistant surface to decorative laminates. Preferably, these overlay sheets comprise a-cellulose paper which is impregnated with a noble thermoset resin, preferably melamine/formaldehyde, and which become transparent upon heat and pressure consolidation of the laminate assembly.

The heat and pressure consolidation is suitably carried out using that machinery, equipment, press-plates, temperature, pressure and press-time used for preparing decorative thermoset laminates from the conventional impregnated kraft paper core layers. Pressures ranging from about 700 to about 1400 psi and temperatures ranging from about 120° to 150° C.

The laminate assembly is consolidated by heat and pressure so that in the high pressure thermoset laminate the thickness of the air-laid substrate is reduced by a factor of about two to about ten. More especially, the heat and pressure consolidation is effected so that in the product laminate, the substrate has a thickness of from about 0.25 mm to about 2.25 mm, as mentioned above.

Further, whilst it is preferred to prepare laminates comprising a single substrate made in accordance with the invention, a single thermosetting resin impregnated decor sheet and, optionally, a thermosetting resin impregnated alpha-cellulose overlay sheet, the invention is not so limited and also encompasses laminates comprising a substrate produced from more than one monostichous, non-hydrogen bonded, air-laid web, the noble thermosetting resin impregnated decor sheet and, optionally, the noble thermosetting resin impregnated overlay sheet.

The following Examples are set forth for purposes of illustration only and are not to be construed as limitations on the present invention except as set forth in the appended claims. All parts and percentages are by weight unless otherwise specified.

EXAMPLE 1

Defibrated kraft linerboard fibers are mixed with powdered phenol/formaldehyde resin and formed onto a stationary screen with the aid of suction applied to the underside of a screen. The resultant fiber resin layer has a thickness of 46 mm, a density of 0.035 g/c.c., a basis weight of 1600 gsm and a fiber to resin weight ratio of 3:1. The deposited fiber-resin layer is preconsolidated, at a pressure of 2300 psi, to a thickness of 2.25 mm.

After conditioning the compacted monostichous, fiber-resin core layer at 60% relative humidity for 24 hours, a decorative thermoset resinous laminate assembly is formed comprising:

(a) The above monostichous core layer, (b) A printed decor paper impregnated with a thermosetting melamine/formaldehyde resin to a resin content of about 40% and, (c) An alpha-cellulose overlay sheet impregnated with a thermosetting melamine/formaldehyde resin to a resin content of about 60%.

After positioning between separating sheets, the assembly is heat and pressure consolidated at 1400 psi and 145° C. to a unitary thermoset decorative laminate with a thickness of 1.12 mm. The laminate is designated laminate A.

A conventional decorative laminate of the same thickness and produced from the same overlay and decor sheets but with the core provided by the requisite number of liquid phenol/formaldehyde resin impregnated kraft paper sheets is also assembled, conditioned and consolidated to a unitary thermoset decorative laminate in the same press with Laminate A. The conventional laminate is designated Laminate 1.

STRESS CRACK TEST

Both of Laminates A and 1 are then cut into 12"×12" samples. Each sample is routed in such a manner as to provide a slot ⅛" wide, and 2" deep into the center of each of two parallel sides in the machine direction. The samples are then conditioned at an elevated relative humidity for a specified length of time. The samples are then immediately placed under restraint in a fixture by clamping across the unslotted edges and proloaded to a fixed tensile stress. The entire assembly is then placed in a low relative humidity environment and the time required for the shrinkage of the sample to cause a crack between the slots is recorded in hours.

The time required for Laminate 1 to crack is 21 hours while Laminate A had not cracked after 48 hours. A second sample of Laminate 1 cracked in 38.4 hours while seven (7) additional samples of Laminate A showed no cracks again after 48 hours.

EXAMPLE 2

The procedure of Example 1 is again followed except that a conventional post-forming laminate is prepared at 128° C. and 1400 psi wherein the core is produced from two Kraft sheets and 2 sheets of X-crepe paper, both impregnated with the phenol-formaldehyde resin, all else remaining equal.

The post-forming laminate is designated as Laminate 2. When subjected to the test outlined above, six (6) samples of Laminate 2 crack after 28.1; 27.8; 33.6; 16.8; 26.9 and 35.7 hours, respectively, while six (6) different samples of Laminate A show no cracks after 49.6 hours each.

EXAMPLE 3-7C

The procedure of Example 1 is again followed except that the amount of resin incorporated into the monostichous core layer is varied in addition to the specific resin employed. The resultant laminates are then subjected to the following test.

CRACK PROPAGATION TEST

Two sections of each laminate are bonded back-to-back with a commercially available adhesive. Samples about 1"×6" are cut from each composite and each sample is routed through 1 thickness of laminate along the middle of the 6" length. One end of the routed trough is cut with a sharp blade about ¼" deep to induce a natural crack. A force is applied to the sample at one side of the cut to propagate the crack and the work required to sustain the propagation of the crack over a specified length is recorded as the average toughness, in. lb./in$^2$.

The results are set forth in Table I, below.

TABLE I

| Example | Core | Average Toughness | | |
|---|---|---|---|---|
| | | Dry[1] | Ambient[2] | Wet[3] |
| 3 | 28% Resin* | 11.7 | 20.5 | 41.8 |
| 4 | 20% Resin** | 14.1 | 23.2 | — |
| 5 | 28% Resin** | 11.4 | 21.9 | 81.8 |
| 6 | 35% Resin** | 11.7 | 17.6 | 66.5 |
| 7C | Laminate 1 | 5.8 | 8.2 | 16.8 |

*a 50/50 mixture of a novalac phenolic resin containing hexamethylenediamine and a resole phenolic resin
**a novalac phenolic resin
C = comparative
[1] less than 1% moisture
[2] about 4% moisture
[3] about 8% moisture As can be readily appreciated, the above examples show that the resistance to stress cracking as evidenced by the above Stress Crack Test is considerably higher for the laminates of the present invention than for laminates manufactured in the conventional manner with phenolic resin impregnated Kraft paper cores. This higher degree of toughness is further substantiated by the increased work required to propogate cracks in the present laminates as shown by the above Crack Propagation Test.

Wet-Laid papers exhibit a variation in at least some of their physical properties, depending upon whether the properties are measured in the direction of travel of the machine upon which the paper was formed, or, transversely of it. This variation in properties is due to the non-random orientation of the fibers of the paper due to the alignment of the fibers caused by the flow of the liquid phase onto and through the wire and by surface tension effects. This difference in properties when measured at mutually perpendicular directions in the plane of the paper is commonly referred to as lack of "squareness" in the paper and one paper is referred to as being more "square" than another if the ratio of its physical properties in the two directions is closer to unity.

The direction of travel of a substrate during its formation whether the substrate be prepared on a conventional paper-making machine, or on an apparatus of the type described hereinabove is commonly referred to as the "machine" or 'X' direction, whereas a direction at right angles thereto across the substrate is commonly referred to as the "cross-machine" or 'Y' direction.

Laminates are conventionally produced from resin-impregnated wet-laid paper sheets by superimposing the sheets with their 'X' and 'Y' directions respectively in parallel and, consequently, they also exhibit this direction dependent variation (lack of squareness) in some at least of their physical properties and although this is not excessively disadvantageous, there are some applications where laminates exhibiting less variation in physical properties according to the direction of measurement (greater squareness) are preferred.

As related above, thermoset resin laminates prepared from wet-laid paper sheet cores possess some physical properties which differ considerably depending upon whether they are measured in the 'X' or 'Y' direction. For example, decorative thermoset laminates when prepared conventionally with cores comprising wet-laid paper sheets commonly exhibit at least twice as great a dimensional movement in the 'Y' direction as in the 'X' direction when subjected to a standard test for determining dimensional stability (N.E.M.A. Test method LD3-304 1975).

It has been found that a decorative laminate comprising a thermosetting resin containing fibrous cellulosic substrate and having a greater degree of squareness than a laminate made by conventional processes may be produced by using, as the substrate, an air-laid web comprising both cellulosic fibers and a thermosetting resin.

More especially, it has been found that a decorative thermoset plastics laminate which comprises a substrate or core prepared from an air-laid web in accordance with the present invention is such that it has a greater degree of squareness than a conventional laminate of substantially the same thickness and comprising an identical decorative sheet (and, optionally, an overlay sheet) and a sufficient plurality of kraft paper core sheets, impregnated with a similar resin to substantially the same content.

EXAMPLE A

This Example relates the production of a monostichous substrate utilizing apparatus and conditions similar to those disclosed above.

The apparatus employed essentially comprises: an electrically driven, air-swept hammermill connected by suitable ducting to a distributor; screw-feed means arranged to feed particulate thermosetting resin into the ducting between the hammermill and the distributor; a distributor comprising a housing having side-walls and end-walls and a perforated planar bottom-wall and side walls, impeller means mounted to rotate about an axis substantially perpendicular to the bottom-wall a short distance above and in non-contacting relationship with the upper surface of said bottom-wall, inlet means for the fiber-containing stream, outlet means whereby fibrous materials are recycled to the hammermill, a plate member located above said impellers and extending inwardly from the side-walls so as to form a partition between the lower part and an upper part of the housing, said distributor being positioned so that the bottom-wall is located above and co-operates with a moving foraminous belt and said side-walls and end-walls being provided with means to restrict passage of air between their lower extremeties and said belt; a moving, foraminous, metal mesh belt positioned above and co-operating with suction means positioned therebelow and a pair of metal compaction rollers mounted so as to act in nip relationship on said belt and a deposited layer thereon.

Soft wood sulphate kraft having a kappa number of 32 is fed to the air-swept hammermill where it is defibrated to provide cellulosic fibers having an average fiber length of about 1 mm. Air, humidified to 70% relative humidity by steam injection means, is fed to the hammermill at a rate of 38.6 cubic meters per kilogram of fibers to produce an air-fiber stream. Solid particulate thermosetting phenolic resin having a mean particle size of about 25 microns is incorporated by the screw-feeder means into the air-fiber stream to provide an air-fiber-resin stream wherein the ratio of resin to fiber was about 1 part to 3 parts, by weight. The air-fiber-resin stream is then passed to the distributor, whence by action of the suction means and the impeller means, the stream is caused to pass through the perforated bottom-wall thereof and to deposit as a fiber-resin layer having a basis weight of 1560 gsm a density of 0.029 g/cc and a thickness of 54 mm upon the foraminous belt which is moving at a speed of 0.8 meters/minute.

The belt and the deposited fiber-resin layer are then passed through the nip of the compaction rollers which exert thereon a line pressure of about 45 Kg/cm and pre-consolidation thereof. The material emergent from the nip is separated from the belt as a thermo-setting phenolic resin containing monostichous substrate of randomly oriented substantially non-hydrogen bonded cellulosic fibers of about 3.6 mm in thickness containing 33%, by weight, of the resin.

EXAMPLE 8

The substrate formed in Example A is used to prepare a high pressure thermoset decorative laminate assembly by arranging in superimposed relationship:

(a) the monostichous substrate;

(b) a printed, paper decor sheet impregnated with a thermosetting melamine-formaldehyde resin to a resin content of about 40%; and (c) an alpha cellulose overlay sheet impregnated with a thermosetting melamine-formaldehyde resin to a resin content of about 50%.

The assembly thus formed is positioned between separating sheets and then consolidated to a unitary thermoset decorative laminate 1.2 mm thick (designated Laminate B) by heating at 145° C. under a pressure of 1400 psi in an hydraulic press. After cooling and removing the laminate from the press, the thermoset decorative laminate, so obtained is identical in appearance to a conventional high pressure thermoset decorative phenolic laminate (designated Laminate 2) of the same thickness and prepared by consolidating to a unitary structure an assembly comprising:

(a) 5 kraft paper core sheets impregnated with a similar liquid thermosetting phenolic resin composition to a resin content of about 33%, by weight, (b) a sheet of the same resin impregnated decor paper as used to prepare Laminate 1, above, and (c) a sheet of the same resin impregnated overlay paper as used to prepare Laminate 1, above.

Whilst Laminate B and Laminate 2 appear identical, certain of their physical properties are markedly different. More especially, when subjected to dimensional stability measurements in accordance with N.E.M.A. Test LD3-304 1975, the ratio of the dimensional movement of Laminate 1 in the 'Y' direction to its movement in the 'X' direction is 1.6:1, whereas the ratio of the dimensional movement of Laminate 2 in the 'Y' direction to that in the 'X' direction is 3.2:1.

When subjected to the above STRESS CRACK TEST and CRACK PROPAGATION TEST, Laminate B exhibits a toughness superior to that of Laminate 2.

EXAMPLE B

Using the apparatus of the type described in Example A, semi-thermochemical softwood pulp is fed to the air-swept hammermill and there defibrated to an average fiber length of about 1.5 mm in the presence of a stream of humidified air at a relative humidity of about 70% flowing at a rate of 40.9 cubic meters of air per kilogram of fiber.

The resultant air-fiber stream leaving the mill is passed via suitable ducting to the distributor and a particulate thermosetting resin of mean particle size of about 20 microns is incorporated into the air-fiber stream at a weight ratio of fiber to resin of 2.5 to 1 by means of a screw feeder adapted to feed material into the ducting. The air-fiber-resin is agitated in the distributor by the impeller means and caused by the suction means to pass through the perforated bottom-wall and deposit, upon the foraminous belt moving at 0.8 m/minute, a fiber-resin layer having a basis weight of 1260 gsm, a thickness of about 30 mm and a density of 0.042 g/cc. The deposited layer and the moving belt are then passed through the nip of the compaction rollers operating at a line loading of 45 Kg/cm and the deposited layer emerging from the nip is separated from the wire to provide a thermosetting resin containing monostichous substrate of randomly oriented, substantially non-hydrogen bonded, cellulosic fibers having a thickness of 6 mm.

EXAMPLE 9

A decorative thermosetting plastics laminate assembly is formed comprising, in superimposed relationship:
  (a) the monostichous substrate formed in Example B,
  (b) a printed decor paper impregnated with a thermosetting melamine-formaldehyde resin to a resin content of about 40%; and
  (d) an alpha-cellulose overlay sheet impregnated with a thermosetting melamine-formaldehyde resin to a resin content of about 60%;
and after positioning between separating sheets the assembly is consolidated to a unitary thermoset decorative laminate (designated Laminate C) comprising:
  (a) a monostichous core layer, about 0.9 mm thick of randomly oriented, substantially non-hydrogen bonded cellulosic fibers, containing about 28% of thermoset phenolic resin;
  (b) a decorative layer comprising the thermoset melamine-formaldehyde resin impregnated printed decor paper sheet; and
  (c) a wear surface layer comprising the thermoset melamine-formaldehyde resin impregnated alpha cellulose overlay sheet.

Laminate C has a ratio of mechanical strength properties in the 'X' to 'Y' directions of 1.26:1 and a ratio of dimensional movement 'Y': 'X' of 1.55:1.

A conventional high pressure decorative thermoset plastics laminate of the same thickness and produced from the same overlay and decor sheets but with the core provided by the requisite number of phenolic resin impregnated kraft paper sheets has a ratio of mechanical strength properties in the 'X' to 'Y' direction of 1.6:1 and a ratio of dimensional movement in the 'Y' to 'X' direction of 2.2:1.

EXAMPLE C

Kraft softwood pulp having a kappa number of 86 is fed to an air-swept hammermill and defibrated, in a humidified air-stream at a relative humidity of 80% at a flow-rate of 61 cubic meters of air per kilogram of fiber, to give cellulosic fibers having an average length of 2.3 mm.

A particulate, thermosetting phenolic resin having a mean particle size of 30 microns is incorporated by screw feeder means into the air-fiber stream in the ducting leading from the mill to the distributor to provide a fiber to resin ratio in the resulting air-fiber-resin stream of 2.9:1. The air-fiber-resin stream is agitated in the distributor and drawn through the bottom-wall, by suction applied to the bottom surface of a foraminous belt moving at a rate of 0.8 m/min, so as to deposit a layer of 1500 gsm basis weight, comprising the fibers and the resin 75 mm thick, having a density of 0.02 g/cc, on the belt and containing 32.5% resin. The wire and deposited layer are passed through the nip of the pair of compaction rollers set to apply a line loading of 45 Kg/cm and the emergent layer is stripped from the wire to provide a thermosetting phenolic resin containing monostichous substrate of randomly oriented substantially, non-hydrogen bonded cellulosic fibers having a thickness of 6 mm.

EXAMPLE 10

A decorative thermosetting plastics laminate assembly is formed and consolidated to a unitary decorative product laminate has a ratio of mechanical strength properties in the 'X' direction to those in the 'Y' direction of 1.23:1 and a ratio of dimensional movement in the 'Y' direction to the 'X' direction of 1.38:1.

A conventional high pressure decorative thermoset plastics laminate of the same thickness and produced from the same overlay and decor sheets but with the core provided by the requisite number of phenolic resin impregnated kraft paper sheets had a ratio of mechanical strength properties in 'X' to 'Y' direction of 1.65:1 and a ratio of dimensional movement in the 'Y' direction to that in the 'X' direction of 2.4:1.

EXAMPLE 11

The procedure of Example 9 is again followed except that the overlay on each laminate is omitted. Again, the high pressure decorative laminate produced from the monostichous substrate of Example B is superior in mechanical strength and dimensional movement properties to the conventional laminate.

EXAMPLE 12

Laminates A and 1 described in Example 1, above, are tested to determine their ratio of mechanical strength and dimensional movement properties. Laminate A has a ratio of mechanical strength properties in the 'X' to 'Y' direction of 1.1:1 and Laminate 1 has a ratio of said properties of 1.5:1.

The ratio of dimensional movement in the 'Y' to 'X' direction of Laminate A is 1.1:1 and of Laminate 1 is 3.8:1.

It is readily apparent from the above Examples that the high pressure laminates of the instant invention exhibit a significantly greater degree of squareness than conventional laminates produced from phenolic resin impregnated Kraft paper fibers.

EXAMPLE 13

The procedure of Example 8 is again followed except that the air-laid web of Example A contains 24.9% of a 50/50 mixture of a first Novalac phenolic resin containing hexamethylenetetramine and a second resole phenolic resin and the fibers are linerboard fibers. The finished high pressure decorative laminate has the following properties:

| | |
|---|---|
| Basic Weight, sanded, gsm | 1653 |
| Density, gm/cc | 1.46 |
| Water absorption, % | 6.69 |

| | |
|---|---|
| Thickness swell; % | 7.40 |
| Dimensional change, % | 1.107 |
| Tensile Strength, pascals, × 10⁷ | 8.67 |
| Modulus, pascals, × 10⁹ | 4.78 |
| Stress Crack, hrs. (See above test) | 92+ |

EXAMPLE 14

The procedure of Example 13 is again followed except that the air-deposited fibers are composed of 95% linerboard and 5% fiberboard mechanical pulp. The properties of the resultant high pressure decorative laminate are as follows:

| | |
|---|---|
| Basis Weight, sanded, gsm | 1751 |
| Density, gm/cc | 1.47 |
| Water absorption, % | 6.30 |
| Thickness swell, % | 5.96 |
| Dimensional change, % | 1.058 |
| Tensile Strength, pascals, × 10⁷ | 8.71 |
| Modulus, pascals, × 10⁹ | 4.70 |
| Stress Crack, hrs. (See above Test) | 92+ |

EXAMPLE 15

The procedure of Example 14 is followed except that the fibers are air-laid from a blend of 90% linerboard fibers and 10% fiberboard mechanical pulp fibers. The properties of the resultant high pressure decorative laminate are as follows:

| | |
|---|---|
| Basis weight, sanded, gsm | 1736 |
| Density, gm/cc | 1.45 |
| Water absorption, % | 6.57 |
| Thickness swell, % | 6.67 |
| Dimensional change, % | 1.035 |
| Tensile Strength, pascals, 10⁷ | 8.91 |
| Modulus, pascals, × 10⁹ | 4.97 |
| Stress Crack, hrs. (See above Test) | 92+ |

EXAMPLE 16

The procedure of Example 13 is again followed except that the dry-laid web is deposited from a fiber mixture containing 90% linerboard fibers and 10% of white pine sawdust which passed through a 20 mesh sieve. The properties of the resultant high pressure decorative laminate are as follows:

| | |
|---|---|
| Basis weight, sanded, gsm | 1749 |
| Density, gm/cc | 1.45 |
| Water absorption, % | 6.60 |
| Thickness swell, % | 7.54 |
| Dimensional change, % | 1.153 |
| Tensile strength, pascals, × 10⁷ | 7.94 |
| Modulus, pascals, × 10⁹ | 4.45 |
| Stress Crack, hrs. (See above Test) | 92+ |

Examples 13–16 show that the high pressure decorative laminates of the present invention possess properties other than stress crack which are substantially equivalent to the properties of a corresponding conventional laminate produced from phenolic resin impregnated Kraft paper fiber.

EXAMPLE 17

When the procedure of Example A is again followed, except that the fibers are first sprayed with the phenolic resin and dried before depositing them on the foraminous belt, and the resultant monostichous substrate is employed in the manufacture of a laminate as in Example 8, substantially equivalent results are achieved.

We claim:

1. A heat and pressure consolidated high pressure decorative laminate comprising, in superimposed relationship,
    (a) a monostichous layer of randomly oriented, substantially non-hydrogen bonded, air-laid cellulosic fibers from about 0.5 to 2.5 mm in average length, said layer being from about 0.25 mm to 2.25 mm thick, of uniform composition and basis weight and containing from about 20 to 35%, by weight, based on the total weight of fiber and resin in (a), of a thermoset resin and
    (b) a thermoset resin impregnated, decorative sheet.

2. A laminate in accordance with claim 1 in which said fibers are cellulosic kraft fibers.

3. A laminate in accordance with claim 1 wherein the thermoset resin in (a) is a phenolic resin.

4. A laminate in accordance with claim 1 wherein the thermoset resin in (a) is a phenolic resin and the thermoset resin in (b) is a melamine/formaldehyde resin.

5. A laminate in accordance with claim 1 containing, positioned atop said (b), (c) a thermoset resin impregnated a-cellulose, transparent overlay sheet.

6. A laminate in accordance with claim 5 wherein the thermoset resin in (a) is a phenolic resin and the thermoset resin in (b) is a melamine/formaldehyde resin.

7. A laminate in accordance with claim 5 wherein the thermoset resin in (c) is a melamine/formaldehyde resin.

* * * * *